United States Patent
Ahart et al.

(10) Patent No.: US 9,935,840 B2
(45) Date of Patent: Apr. 3, 2018

(54) SYSTEMS AND METHODS FOR SELF-CONFIGURING WIRELESS DEVICE INITIALIZATIONS

(71) Applicant: Digi International Inc., Minnetonka, MN (US)

(72) Inventors: Curt Ahart, Shorewood, MN (US); Harald Remmert, Minnetonka, MN (US)

(73) Assignee: Digi International Inc., Minnetonka, MN (US)

( * ) Notice: Subject to any disclaimer, the term of this patent is extended or adjusted under 35 U.S.C. 154(b) by 0 days.

(21) Appl. No.: 15/061,913

(22) Filed: Mar. 4, 2016

(65) Prior Publication Data
US 2017/0257274 A1    Sep. 7, 2017

(51) Int. Cl.
*H04M 3/00* (2006.01)
*H04L 12/24* (2006.01)
*H04W 4/00* (2018.01)
*H04W 48/16* (2009.01)

(52) U.S. Cl.
CPC ......... *H04L 41/0886* (2013.01); *H04W 4/001* (2013.01); *H04W 48/16* (2013.01)

(58) Field of Classification Search
CPC ..... H04W 8/245; H04W 48/16; H04W 48/18; H04W 88/06; H04W 80/04; H04L 2012/5607
See application file for complete search history.

(56) References Cited

U.S. PATENT DOCUMENTS

| | | | | |
|---|---|---|---|---|
| 5,655,003 A | * | 8/1997 | Erving | H04W 88/06 379/418 |
| 5,734,980 A | * | 3/1998 | Hooper | H04W 48/18 455/433 |
| 5,950,130 A | * | 9/1999 | Coursey | H04W 48/16 455/419 |

(Continued)

OTHER PUBLICATIONS

"5400-RM OOB Cellular Remote Manager", Dec. 17, 2015, pp. 1-2, Publisher: retrieved Dec. 23, 2015 from https://accelerated.com/resources/files/products/5400-RM/Accelerated_5400-RM_Cellular_Remote_Manager_Data_Sheet.pdf.

(Continued)

*Primary Examiner* — Steve D Agosta
(74) *Attorney, Agent, or Firm* — Fogg & Powers LLC

(57) ABSTRACT

Systems and methods for self-configuring wireless device initializations are provided. In one embodiment, a network device comprises: a radio module that includes a plurality of wireless service support circuits, wherein each of the support circuits includes modules that configure the radio module to establish wireless network communication links over at least one band of a wireless network operator; initialization logic coupled to the radio module; and a network service preference policy stored in a memory coupled to the initialization logic; wherein, upon initialization of the device, the initialization logic surveys one or more wireless services received by the radio module and compares results of the survey against a network service preference policy; and wherein the initialization logic activates a first support circuits associated with a first wireless service when the survey indicates that the first wireless signal satisfies the network service preference policy.

13 Claims, 3 Drawing Sheets

(56) References Cited

U.S. PATENT DOCUMENTS

| | | | | |
|---|---|---|---|---|
| 6,603,755 | B1* | 8/2003 | Parker | H04W 48/18 370/342 |
| 9,021,010 | B1* | 4/2015 | Das | H04L 41/0813 709/201 |
| 2005/0124375 | A1* | 6/2005 | Nowosielski | A61B 3/032 455/550.1 |
| 2006/0223575 | A1* | 10/2006 | Su | H04W 48/16 455/552.1 |
| 2008/0051132 | A1* | 2/2008 | Lim | H04W 48/16 455/552.1 |
| 2013/0005299 | A1* | 1/2013 | Raleigh | G06Q 10/06375 455/406 |
| 2013/0244723 | A1* | 9/2013 | Yerrabommanahalli | H04W 48/16 455/552.1 |
| 2015/0156056 | A1 | 6/2015 | Lowery | |

OTHER PUBLICATIONS

"Cisco 812 CiFi Integrated Services Routers (3g/3.7G Cellular and WiFi)", "May 2013", pp. 1-12, Publisher: retrieved Dec. 22, 2015 from http://www.cisco.com/c/en/us/products/collateral/routers/800-series-routers/datasheet_c78-680001.html.

"Configuring Cisco EHWIC and 880G for 3.7G (HSPA+)/3.5G (HSPA)", , pp. 1-175, Publisher: retrieved on Dec. 22, 2015 from http://www.cisco.com/c/en/us/td/docs/routers/access/1800/1861/software/feature/guide/mrwls_hspa.html.

"Application Note 14: Configure a SIM cellular router to automatically failover to a second SIM card and revert back to the original SIM after a specified amount of time", Sep. 27, 2012, pp. 1-31, Publisher: retrieved Dec. 22, 2015 from http://ftp1.digi.com/support/documentation/AN_014_Dual%20SIM%20failover.pdf.

"Industrial Grade 3G 4G Dual SIM Cellular Router User Manual H720 Series", "retrieved Dec. 22, 2015 from http://www.acandia.se/pub_docs/files/Routrar/H720_Usermanual_Eng.pdf", Jan. 22, 2014, pp. 1-97, Publisher: E-Lins Technology Co., Limited.

"Cradlepoint Takes Out-of-Band Management to the Cloud", May 6, 2015, pp. 1-2, Publisher: retrieved Dec. 23, 2015 from https://cradlepoint.com/sites/default/files/ema_cradlepoint_oobmgmt_cloud_0415_ib_1.pdf.

"Maintain Network Availability with Automatic Network Failover to Cellular", May 29, 2015, pp. 1-2, Publisher: retrieved Dec. 23, 2015 from http://www.emersonnetworkpower.com/documentation/en-US/Brands/Avocent/Documents/DataSheets/01/AV-49200.pdf.

"Huawei Configuration Guide—Interface Management Section 12: LTE Cellular Interface Configuration", , pp. 1-32, Publisher: retrieved Dec. 22, 2015 from http://support.huawei.com/enterprise/docinforeader.action?contentId=DOC1000051567&partNo=10072.

"AR 150, AR 160 and AR 200 Series Enterprise Routers Brochure", Oct. 13, 2014, pp. 1-26, Publisher: Huawei Technologies Co., Ltd.

Mallett, "How to Implement Cellular Out-Of-Band Connectivity to Manage Your Distributed IT Infrastructure using Opengear Advanced Cellular Routers and Console Servers", "Cellular Out-Of-Band Access for IT Infrastructure Management", May 18, 2011, pp. 1-5, Publisher: retrieved from http://opengear.com/sites/default/files/documentation/AppNote-Cellular-Out-Of-Band.pdf.

"Cellular Out-Of-Band Highlights", , pp. 1-2, Publisher: Retrieved Dec. 23, 2015 from http://opengear.com/solutions/cellular-out-band.

"Cellular Out-Of-Band Overview", , pp. 1-2, Publisher: retrieved Dec. 23, 2015 from http://opengear.com/solutions/cellular-out-band.

"Network Resilience for Enterprise Remote Sites", , pp. 1-2, Publisher: retrieved Dec. 23, 2015 from http://opengear.com/brochures/product-resilience-gateway.pdf.

"Opengear Announces Pair of New REsilience Gateway Models at LISA15 to Meet Growing Demand", Nov. 9, 2015, pp. 1-2, Publisher: retrieved Dec. 23, 2015 from http://opengear.com/newsroom/opengear-announces-pair-new-resilience-gateway-models-lisa15-meet-growing-demand.

"SpeedFusion Bandwidth Bonding Technology", , pp. 1-6, Publisher: retrieved Dec. 22, 2015 from http://www.peplink.com/technology/speedfusion-bonding-technology.

"Siemens Launches Rugged Cellular Router", Jan. 27, 2015, pp. 1-2, Publisher: retrieved Dec. 22, 2015 from http://www.masstransitmag.com/press_release/12038585/siemens-launches-rugged-cellular-router.

"Sony XperiaC User Guide C2305/C2304", , pp. 1-123, Publisher: retrieved Dec. 22, 2015 from http://www-support-downloads.sonymobile.com/c2305/userguide_EN_C2305-C2304_2_Android4.2.pdf.

"Teldat—Wireless WAN compact routers—Product Highlights", , pp. 1-2, Publisher: retrieved Dec. 23, 2015 from http://www.teldat.com/en/page.php?cnt_id=lte-4g-3g-broadband-compact-enterprise-router-en.

"Network resilience through cellular router backup", , pp. 1-2, Publisher: retrieved Dec. 23, 2015 from http://www.teldat.com/en/page.php?cat_id=network-resilienve-cellular-router-backup.

"Out-of-Band", May 15, 2015, pp. 1-2, Publisher: retrieved Dec. 23, 2015 from http://www.uplogix.com/documents/collateral/Uplogix_out-of-band_solution_brief.pdf.

"Using 3G/4G Modems for Remote Out-of-Band Access", pp. 1-5, Publisher: retrieved Dec. 23, 2015 from https://www.wti.com/t-wti-white-paper-using-3g-4g-for-out-of-band.aspx.

"Xperia Care User Guide", , pp. 1-5, Publisher: retrieved Dec. 23, 2015 from http://support.sonymobile.com/global-en/xperiac/userguide/Network-settings/.

* cited by examiner

SYSTEMS AND METHODS FOR SELF-CONFIGURING WIRELESS DEVICE INITIALIZATIONS

BACKGROUND

Industrial cellular devices are often utilized to bring connectivity to devices placed in remote or difficult to reach locations. In addition to providing connectivity to rural or less developed regions with limited transportation infrastructure, industrial cellular devices may also be used to provide wireless connectivity to sensors or other electronics placed in inhospitable locations such as within storage tanks, on towers, stacks or structures of industrial plants, near dangerous operating equipment or otherwise within dangerous operating environments. Cellular connections provide data connectivity to these areas while avoiding the need to run data cables or, in some cases, the need to penetrate containment barriers such as a vessel wall.

Typically, these industrially cellular devices are installed and activated by technicians who travel to the installation location, sometimes at considerable expense. For example, in industrial situations, plant equipment and processes may need to be shut down or the area otherwise made safe for the technician to enter in order to install the cellular device. One issue with cellular communications, however, is that the quality of cellular service at a particular installation site is often unknown until the technician arrives and can determine signal qualities. A process that involves having the technician performing a site signal survey, and then interpreting the results to determine which cellular service carriers have usable signals for that location, is a time consuming process that creates costs for both the technician's employer and the site operator whose equipment may be out of service during the installation process. If the technician did not bring with them a device compatible with the cellular service available as determined by the survey, a second trip to bring a compatible device will be needed. Alternatively, the technician could bring multiple devices with them to the installation site to allow for contingencies. However, this strategy necessarily requires always maintaining and transporting an inventory of extra devices that are readily available to the technician at the installation site. In addition, in some environments where foreign material exclusion or contamination are of concern, carrying extra equipment to an installation site may be greatly discouraged.

For the reasons stated above and for other reasons stated below which will become apparent to those skilled in the art upon reading and understanding the specification, there is a need in the art for improved systems and methods for self-configuring wireless device initializations.

SUMMARY

The Embodiments of the present disclosure provide methods and systems for self-configuring wireless device initializations and will be understood by reading and studying the following specification.

Systems and methods for self-configuring wireless device initializations are provided. In one embodiment, a network device comprises: a radio module that includes a plurality of wireless service support circuits, wherein each of the plurality of wireless service support circuits includes modules that configure the radio module to establish wireless network communication links over at least one band of a wireless network operator; initialization logic coupled to the radio module; and a network service preference policy stored in a memory coupled to the initialization logic; wherein, upon initialization of the device, the initialization logic performs a surveys of one or more wireless services received by the radio module and compares results of the survey against a network service preference policy; and wherein the initialization logic activates a first of the plurality of wireless service support circuits associated with a first wireless service of the one or more wireless services when the survey indicates that the first wireless signal satisfies the network service preference policy.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present disclosure. The following detailed description is, therefore, not to be taken in a limiting sense.

Embodiments of the present disclosure provide wireless network devices, such as wireless network devices, that comprise circuitry that supports a plurality of communications service options and further includes initialization logic that surveys available wireless service signals, compares the results with a preprogramed service preference policy, and then activates the circuitry associated with a wireless service and provider that best satisfied the service preference policy. In some embodiments, options are also provided for the initialization logic to place into a dormant state circuitry associated with non-selected services to reduce device power consumption and potentially avoid service fees that may be associated with a non-selected service. Dorman circuitry is not permanently disable but may be reactivate at some point in the future. In some embodiments, if signal quality conditions at the installation site change over time so that the service preference policy is no longer satisfied, the device may re-initiate the initialization logic. Further, in some embodiments, the preprogramed service preference policy may be remotely updated (for example, if a different carrier begins to offer more favorable data services or fees) and the initialization logic again re-initialized.

Figure 1:
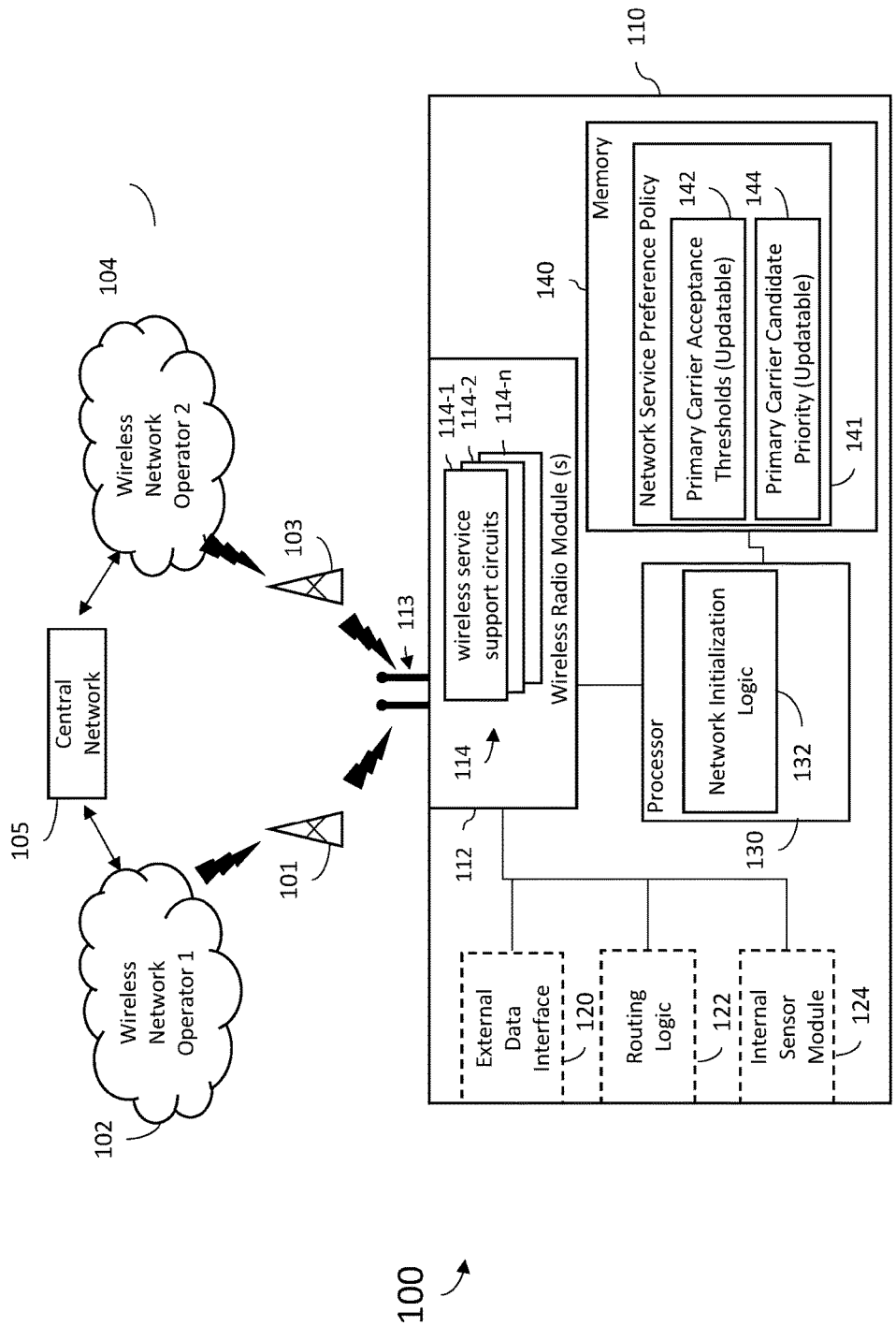
FIG. 1 is a diagram illustrating a network device of one embodiment of the present disclosure.

FIG. 1 is a diagram illustrating a network device 100 of one embodiment of the present disclosure. Network device 100 comprises at least one antenna 113 coupled to at least one wireless radio module 112 that includes a plurality of wireless service support circuits 114-1 to 114-*n* (shown collectively at 114). In some embodiments, the at least one antenna 113 may comprise two or more antennas 113. In some embodiments the antenna 113 may be integral within the wireless radio module 112 or alternatively may be external to it. Each of the plurality of wireless service support circuits include modules (such as integrated circuits, for example) with information that configures wireless radio module 112 to establish wireless communication links over at least one band of a particular wireless network operator. For example, in one embodiment, the wireless service support circuits store unique serial numbers, subscriber identity numbers, security authorization information, ciphering information or other information wireless radio module 112 would utilize to authenticate itself and establish a communication link with a particular wireless network. In some embodiments, one or more of the wireless service support circuits 114-1 to 114-*n* may comprise a subscriber identification module (SIM) which may be either hardwired into wireless radio module 112 or implemented as a removable/replicable SIM card that interfaces with wireless radio module 112 via a card reader. In some embodiments wireless radio module 112 may comprise multiple individual cellular modems and/or other wireless communication modems provided within the single form-factor of network device 100.

Depending on its ultimate purpose, network device 100 may comprise, for example, one or more sensor modules 124, an external data interface 120, routing logic 122 or some combination thereof. For example, in one embodiment, network device 100 is coupled via external data interface 120 to one or more external devices 121. In one embodiment, device 100 functions to communicate data between external devices 121 and a central network 105 via a selected wireless network communication link (such as shown at 101 or 103). In another embodiment, device 100 may instead, or further, comprise one or more sensor modules 124 that communicate data to central network 105 (which may include sensors for applications such as but not limited to, sound, visual images, temperature, pressure, opacity, process flow or level, or some other measureable data or parameter). In still other embodiments, device 100 may include routing logic 122 that includes logic that routes data communications between devices 121 connected to interface 120, sensor modules 124 and/or central network 105 via the selected wireless network communication link.

As shown in FIG. 1, with embodiments of the present disclosure, network device 100 further comprises network initialization logic 132 which configures wireless radio module 112 to utilize a selected one of the plurality wireless service support circuits 114-1 to 114-*n* for communicating with central network 105 based on satisfying a network service preference policy 141. In one embodiment, wireless network initialization logic 132 comprises instruction code executed by a processor 130 that is coupled to a memory 140 within which the network service preference policy 141 is stored. In some embodiments, processor 130 may comprise a microprocessor, controller, or other programmable device. In other embodiments, processor 130 may comprise an application specific integrated circuit (ASIC) or Field Programmable Gate Array (FPGA) configured to implement wireless network initialization logic 132. In alternate embodiments, the memory 140 storing the network service preference policy 141 may be either internal or external to processor 130.

In one embodiment in operation, device 100 is mounted at the installation site, powered up, and the wireless network initialization logic 132 is activated. The wireless network initialization logic 132 activates the wireless radio module 112 to perform a quality survey that measures one or more wireless signal parameters in situ for one or more wireless network services. The network service preference policy 141 is applied to the measured wireless signal parameters to identify a wireless network service that best satisfies criteria set forth in the policy 141. Wireless network initialization logic 132 then configures wireless radio module 112 to utilize that wireless network service. For example, during one example device 100 initialization, wireless network initialization logic 132 determines that the signal 101 from wireless network 102 best satisfies network service preference policy 141 and therefore activates wireless service support circuit 114-1 which is associated with wireless network 102. For another device 100 initialization, wireless network initialization logic 132 determines that the signal 103 from wireless network 104 best satisfies network service preference policy 141 and therefore activates wireless service support circuit 114-2 which is associated with wireless network 104. In either case, the remaining non-selected wireless service support circuits may at that point be placed into a dormant state (for example, to conserve power resources or to avoid costs associated with non-selected services). In some embodiments, advanced optimization to select a service may be performed on device 100 or remotely through additional data, for example based on location, nearby devices, mobile network operator (MNO) or mobile virtual network operator (MVNO) information or customer-specific requirements.

If wireless network initialization logic 132 determines that no available wireless network can satisfy network service preference policy 141, then in some embodiments an indication may be generated (such as by an indicator 133 coupled to processor 130) to locally alert the installation technician of that fact. The indication may be visible and/or audible, or provided by some other means. For example the indication could be provided via a human machine interface on the device 100 (for example, indicator 133 may comprised an LED or display) or via a wired (USB, Serial, Ethernet, etc.) or wireless (Bluetooth, Wi-Fi, etc.) interface to the installer's laptop, tablet or mobile phone. The installer can then check the placement of the device 100 (and/or any antennas 113 couple to device 100), until the wireless network initialization logic 132 has found a viable mobile network that satisfies network service preference policy 141. In some implementations, when no wireless service is found that satisfies network service preference policy 141, the wireless network initialization logic 132 may also optionally select for activation a designated default wireless service support circuit 114 for the wireless network coming closest to satisfying network service preference policy 141.

In some embodiments, the network service preference policy 141 comprises two components which may include primary carrier acceptance thresholds 142 and an initial primary carrier candidate preference priority 140. The primary carrier acceptance thresholds 142 describe the minimum acceptance criteria for several quality thresholds that a wireless signal needs to satisfy to be considered acceptable for use. These thresholds 142 defined by policy 141 may vary for each particular device and be custom programed for each device installation based on the data communication qualities that device 100 needs to reliably perform its function at that installation site.

The initial primary carrier candidate preference priority 144 of policy 141 indicates which wireless network is the device operator's preferred network, assuming the signal at the installation site satisfies the primary carrier acceptance thresholds 142. That is, assuming network 101 and 103 both satisfy the primary carrier acceptance thresholds 142, the primary carrier candidate preference priority 144 indicates which of the two should be selected. This indication may be based on non-technical criteria such as fees and operating costs. For example, if connectivity over network 102 can be obtained at a cheaper costs than over network 104, and the signal of network 102 satisfies the thresholds 142, then wireless network initialization logic will select network 102 even if the signal quality of network 104 is moderately or even significantly superior. For embodiment where device 100 includes only a pair of wireless service support circuits 114, the primary carrier candidate preference priority 144 may simply indicate a single preferred network provider. Alternatively, where device 100 may include more than two wireless service support circuits 114, the primary carrier candidate preference priority 144 may define a preference ranking of potential network providers. For example, if the highest ranked primary carrier candidate does not satisfy the thresholds 142, then logic 132 may select from those that do by selecting the candidate having the next highest ranking per the primary carrier candidate preference priority 144.

In some implementations, wireless network initialization logic 132 may utilize the primary carrier candidate preference priority 144 to select an order in which wireless signals are measured. For example, the wireless signal for the most preferred carrier candidate would be tested first so that if the most preferred carrier satisfied the thresholds 142, then connectivity services via that network can be immediately activated without the need for measuring and evaluating other wireless service signals for less preferred candidates.

With respect to specific wireless signal parameters tested by wireless network initialization logic 132 and defined by the primary carrier acceptance thresholds 142, both the measured parameters and the associated acceptance thresholds may be selected on an installation-by-installation bases by considering the connectivity needs of a deployed device 100 for its specific application. Common signal parameters and quality measurements which may be surveyed by wireless network initialization logic 132 include but are not limited to the network technology being used (for example does the network technology in use meet Global System for Mobile Communications (GSM), Enhanced Data rates for GSM Evolution (EDGE), 3G or 4G cellular, 4G Long-Term Evolution (LTE) or some other wireless communication standard), tower information, network signal strength (such as received signal strength indicator (RSSI) or Reference Signal Received Power (RSRP) measurements), signal quality (such as the ratio of the received energy per chip and the interference level (Echo) or Reference Signal Received Quality (RSQP) measurements) or signal interference (such as a signal-to-interference-plus-noise ratio (SINR) measurement).

For each measured parameter, the criteria that specifies what are satisfactory survey results is defined by the primary carrier acceptance thresholds 142. The criteria selected to determine if device 100 will operate as desired at one installation location may differ from the criteria selected for another installation location. For example, in one installation location, if signal quality is measured to be at least fair, it may be acceptable for SINR measurements to be poor. At a another installation location, it may be necessary for signal interference measurements to be low for device 100 to operate as desired but it may be acceptable for network signal strength to be fair. If the minimum combination defined by the primary carrier acceptance thresholds 142 are met by a wireless service, then that network is a candidate that may be accepted.

In one embodiment, the wireless service defined by primary carrier candidate preference priority 144 as the primary preference is surveyed first. If that wireless service meets the primary carrier acceptance thresholds 142, then it is selected and no further survey measurements for other wireless services need to be performed. If the primary preference does not meets the primary carrier acceptance thresholds 142, then a secondary preference is surveyed. There may be one or more ranked preferences indicated by the primary carrier candidate preference priority 144 depending on the number of wireless service support circuits 114 available in device 100. For example, in one embodiment where device 100 includes two cellular SIM cards, then primary carrier candidate preference priority may only define a preferred primary carrier associated with one of the SIM cards, and the secondary SIM card would by default be considered the secondary preference.

In some embodiments, one or both of the primary carrier acceptance thresholds 142 and primary carrier candidate preference priority 144 may be updated either remotely or locally. For example, if a wireless network operator revises its rate plan to offer more attractive data rates, then the primary carrier candidate priority 144 component of the network service preference policy 141 can be updated to increase the priority ranking of that wireless network operator, or designate it as the primary preference. Network initialization logic 132 can then be reactivated and perform a survey as discussed above to determine if device 100 can take advantage of the new rate plan. That is, if a wireless service that falls under the new rate plan is found to satisfy the Primary Carrier Acceptance Thresholds 142, then network initialization logic 132 can switch wireless radio module 112 over to a wireless service support circuit 114 associated with that wireless service to take advantage of the new rate plan.

It should also be understood that the operating environment in which device 100 exists can evolve over time. For example, new buildings or other structure can be constructed, or interference sources installed, which alter the long-term signal quality of wireless services available to device 100. As such in some embodiments, network initialization logic 132 can self-initialize to conduct a new survey of available wireless services as discussed above. For example, in one implementation, the signal quality of a wireless service that previously satisfied the Primary Carrier Acceptance Thresholds 142 may change so that connectivity with central network 105 via that wireless service becomes significantly degraded or unusable. In that case, network initialization logic 132 can conduct a new survey to see if a previously non-selected wireless service satisfies the Primary Carrier Acceptance Thresholds 142. If so, then network initialization logic 132 can switch wireless radio module 112 over to a wireless service support circuit 114 associated with that wireless service to restore quality connectivity.

In one embodiment, the design mission of device 100 (or other operating considerations) may change so that a different set of Primary Carrier Acceptance Thresholds 142 than those originally programmed into network service preference policy 141 become more appropriate. If so, then the Primary Carrier Acceptance Thresholds 142 component of the network service preference policy 141 can be updated with those new criteria. Network initialization logic 132 may then conduct a new survey in the manner discussed above to see if the current primary wireless service meets the new criteria and/or which other available wireless service now satisfies the Primary Carrier Acceptance Thresholds 142. Based on the results of the survey, network initialization logic 132 can then, if necessary, switch wireless radio module 112 over to a wireless service support circuit 114 associated with a wireless service that satisfies the new thresholds.

Figure 2:
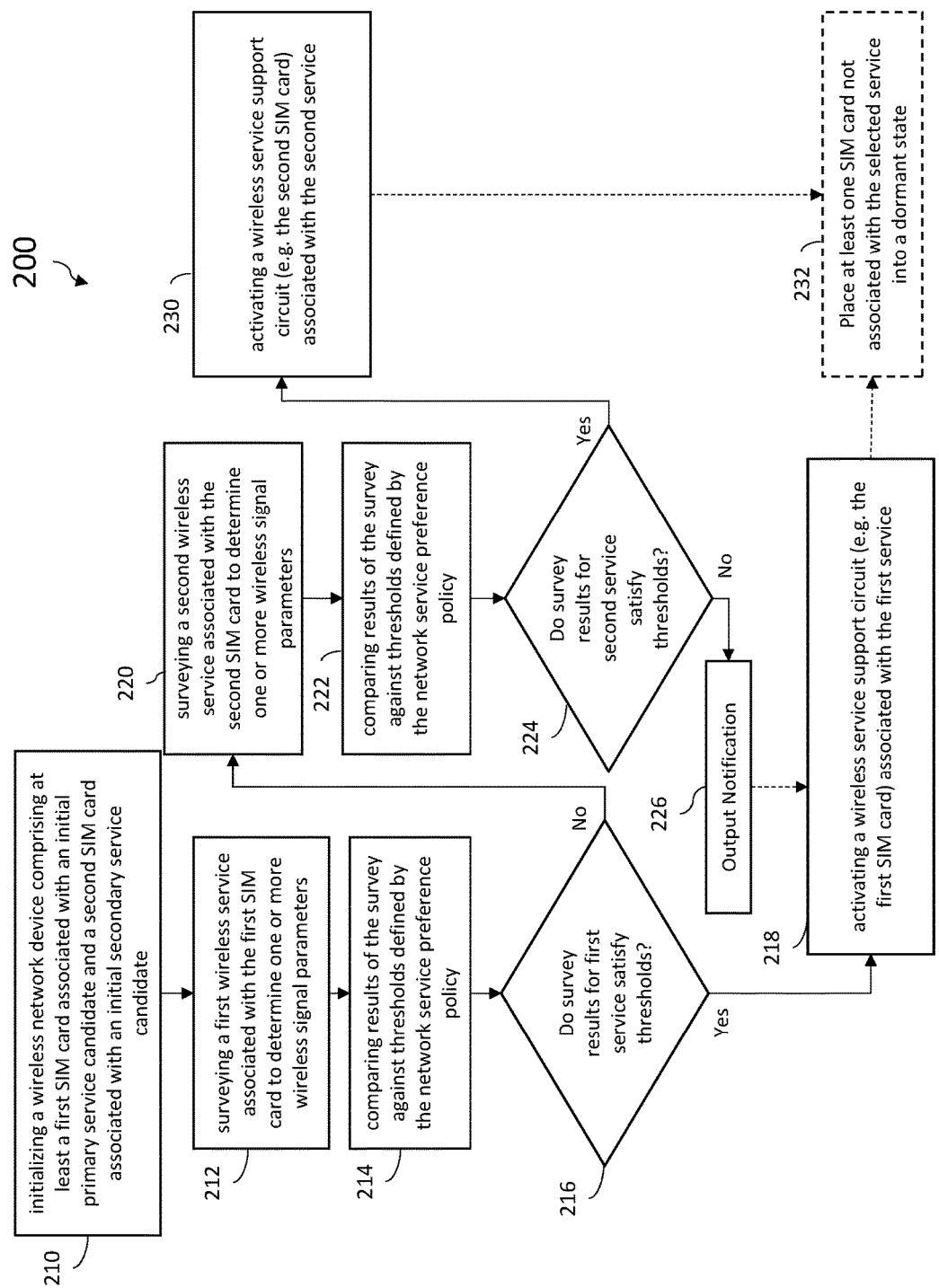
FIG. 2 is a flow chart illustrating a method of one embodiment of the present disclosure.

FIG. 2 is a flow chart illustrating a method 200 of one embodiment of the present disclosure. It should be understood that method 200 may be implemented in conjunction with any of the embodiments described above with respect to FIG. 1. As such, elements of method 200 may be used in conjunction with, in combination with, or substituted for elements of those embodiments described above. Further, the functions, structures and other description of elements for such embodiments described above may apply to like named elements of method 200 and vice versa. Method 200 is described in terms of a specific cellular implementation of a network device 100 using cellular communication technology where the wireless service support circuits 114 are implemented using SIM cards. It should be appreciated that method 200 however is not limited and in other implementations may be accomplished using wireless technologies other than cellular communication technology and SIM cards.

The method begins at 210 with initializing a wireless network device comprising at least a first SIM card associated with an initial primary service candidate and a second SIM card associated with an initial secondary service candidate. In one embodiment, a network service preference policy stored on the network device defines which wireless service is considered the primary service candidate and which is considered the second service candidate.

The method proceeds to 212 with surveying a first wireless signal associated with the first SIM card to determine one or more wireless signal parameters and to 214 with comparing results of the survey against thresholds defined by the network service preference policy. When the results of the survey indicate indicates that the first wireless signal satisfies the network service preference policy (at block 216) then the method proceeds to 218 with activating a first of the wireless service support circuits associated with the signal. In this example the wireless service support circuit activated would be the first SIM card.

If based on the results of the survey the first wireless signal does not satisfy the thresholds, the method instead proceeds from 216 to 220 with surveying a second wireless signal associated with the second SIM card to determine one or more wireless signal parameters and to 222 with comparing results of the survey against thresholds defined by the network service preference policy. When the results of the survey indicate indicates that the second wireless signal satisfies the thresholds defined by the network service preference policy (at block 224) then the method proceeds to 230 with activating a second of the wireless service support circuits associated with the second signal. In this example the wireless service support circuit activated would be the second SIM card. For network device having more than two wireless service support circuits (SIM cards in this example), the surveying may iteratively continue in an order specified in the preference policy until a signal satisfying the thresholds is identified. In one embodiment, when a signal satisfying the thresholds is identified and selected, the wireless service support circuits for those wireless services not selected may optionally be placed into a dormant state as shown at 232 (for example, to reduce local power consumption or avoid provider fees).

If no surveyed signal is identified as satisfying the thresholds, then the method may optionally proceed to 226 to output a notification to that affect. In some embodiments, the output notification may comprise an indication that is visible and/or audible, or provided by some other means. The indication could be provided via a human machine interface on the device or via a wired (USB, Serial, Ethernet, etc.) or wireless (Bluetooth, Wi-Fi, etc.) interface. The installer can then check the placement of the device (and/or any antennas couple to device), to determine if a viable mobile network that satisfies network service preference policy can be identified. In some implementations, when no wireless service is found that satisfies network service preference policy, the method may also optionally select for activation a designated default wireless service support circuit or one for the wireless network coming closest to satisfying network service preference policy's thresholds.

Figure 2A:
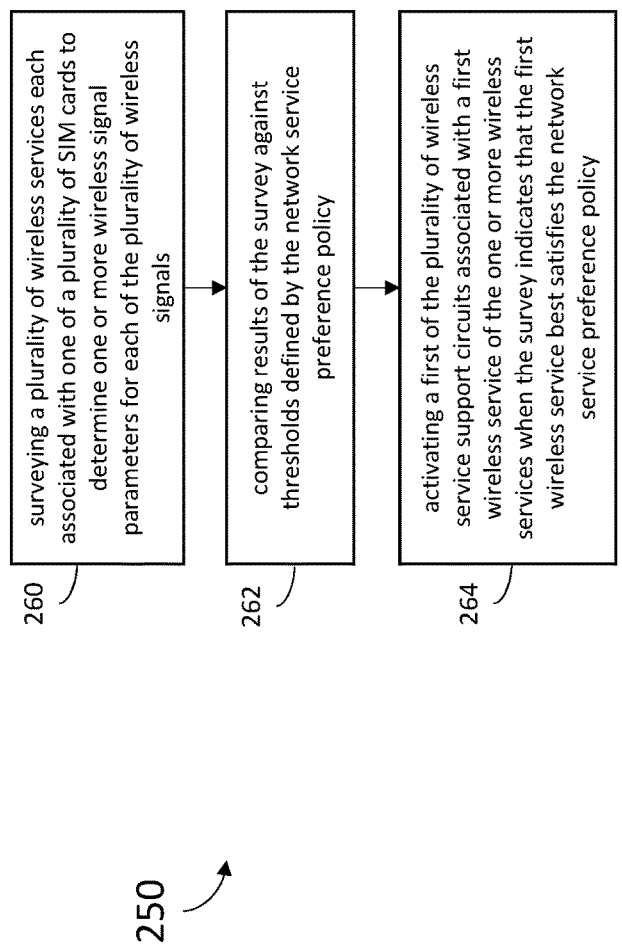
FIG. 2A is another flow chart illustrating a method of one embodiment of the present disclosure.

FIG. 2A a flow chart illustrating a method 250 which is a variation of the method 200 illustrated in FIG. 2. Method 200 may also be implemented in conjunction with any of the embodiments described above with respect to FIG. 1. As such, elements of method 250 may be used in conjunction with, in combination with, or substituted for elements of those embodiments described above. The functions, structures and other description of elements for such embodiments described above may apply to like named elements of method 250 and vice versa. It should be appreciated that method 200 however is not limited to cellular technology and in other implementations may be accomplished using wireless technologies other than cellular communication technology and SIM cards.

Method 200 in FIG. 2 followed an approach where a preferred wireless service could be tested first (for example, a wireless service provide the least expensive rates) and if that preferred wireless service satisfies the desired thresholds, there was no need to continue with surveying a second service. In contrast to method 200, method 250 seeks to identify the wireless service that best satisfies the desired thresholds, and uses that wireless service. The method begins at 260 with surveying a plurality of wireless signals each associated with one of a plurality of SIM cards to determine one or more wireless signal parameters for each of the plurality of wireless signals and proceeds to 262 with comparing results of the survey against thresholds defined by the network service preference policy. The method then proceeds to 264 with activating a first of the plurality of wireless service support circuits associated with a first wireless service of the one or more wireless services when the survey indicates that the first wireless signal best satisfies the network service preference policy. For example, where the service fee structures associate with the various network options are essentially equivalent to remove service cost as a differentiation factor, method 250 at block 264 may review the results across all the available wireless services and select the service that provides superior connectivity from a technical perspective.

Example Embodiments

Example 1 includes a network device, the device comprising: a radio module that includes a plurality of wireless service support circuits, wherein each of the plurality of wireless service support circuits includes modules that configure the radio module to establish wireless network communication links over at least one band of a wireless network operator; initialization logic coupled to the radio module; and a network service preference policy stored in a memory coupled to the initialization logic; wherein, upon initialization of the device, the initialization logic performs a surveys of one or more wireless services received by the radio module and compares results of the survey against a network service preference policy; and wherein the initialization logic activates a first of the plurality of wireless service support circuits associated with a first wireless service of the one or more wireless services when the survey indicates that the first wireless signal satisfies the network service preference policy.

Example 2 includes the device of example 1, wherein base on the survey, the initialization logic places into a dormant state one or more of the plurality of wireless service support circuits that do not satisfy the network service preference policy.

Example 3 includes the device of any of examples 1-2, wherein the network service preference policy comprises: a primary carrier acceptance thresholds component; and a primary carrier candidate preference priority component.

Example 4 includes the device of example 3, wherein the primary carrier acceptance thresholds component of the network service preference policy defines acceptance criteria for one or more wireless signal parameters.

Example 5 includes the device of example 4, wherein the wireless signal parameters include acceptance criteria regarding one or more of: network technology; tower information; network signal strength measurements; signal quality measurements; and signal interference measurements.

Example 6 includes the device of any of examples 3-5, wherein the primary carrier candidate preference priority component indicates a preferred wireless network for the initialization logic to select when a wireless service associated with the preferred wireless network satisfies the primary carrier acceptance thresholds component of the network service preference policy Example 7 includes the device of any of examples 3-6, wherein the initialization logic surveys a wireless service associated with a preferred wireless network indicated by the primary carrier candidate preference priority component before surveying other wireless services.

Example 8 includes the device of any of examples 1-7, wherein the plurality of wireless service support circuits comprise one or more subscriber identification modules (SIMs).

Example 9 includes the device of any of examples 1-8, further comprising one or more sensor modules positioned within the device and configured to wirelessly communicate sensor data with a central network via the radio module using the first wireless service.

Example 10 includes the device of any of examples 1-9, further comprising at least one external data interface configured to wirelessly communicate data from one or more external devices with a central network via the radio module using the first wireless service.

Example 11 includes the device of example 10, further comprising routing logic that routes data communicated between the at least one external data interface and the central network.

Example 12 includes the device of any of examples 1-11, wherein the wireless network initialization logic is implemented by a processor, a field programmable gate array (FPGA), or and application specific integrated circuit (ASIC).

Example 13 includes the device of any of examples 1-12, wherein the radio module comprises multiple individual wireless modems provided within a single form-factor of the network device.

Example 14 includes the device of any of examples 1-13, wherein the network service preference policy is either locally or remotely reprogrammable.

Example 15 includes a method for wireless device initialization of a network device having a radio module that includes a plurality of wireless service support circuits, wherein each of the plurality of wireless service support circuits includes modules that configure the radio module to establish wireless network communication links over at least one band of a wireless network operator, the method comprising: activating initialization logic within the network device to perform a survey of one or more wireless services received by the radio module; comparing results of the survey against a network service preference policy; and activating a first of the plurality of wireless service support circuits associated with a first wireless service of the one or more wireless services when the survey indicates that the first wireless signal satisfies the network service preference policy.

Example 16 includes the method of any of examples 15, further comprising: deactivating one or more of the plurality of wireless service support circuits that do not satisfy the network service preference policy.

Example 17 includes the method of any of examples 15-16, wherein the network service preference policy comprises: a primary carrier acceptance thresholds component; and a primary carrier candidate preference priority component.

Example 18 includes the method of example 17, wherein the primary carrier acceptance thresholds component of the network service preference policy defines acceptance criteria for one or more quality thresholds.

Example 19 includes the method of any of examples 17-18, wherein the primary carrier candidate preference priority component indicates a preferred wireless network for the initialization logic to select when a wireless service associated with the preferred wireless network satisfies the primary carrier acceptance thresholds component of the network service preference policy.

Example 20 includes the method of any of examples 15-19, wherein the survey evaluates the one or more wireless services to determine wireless signal parameters including one or more of: network technology; tower information; network signal strength measurements; signal quality measurements; and signal interference measurements.

In various alternative embodiments, system elements, method steps, or examples described throughout this disclosure (such as the network initialization logic, network service preference policy, or sub-parts thereof, for example) may be implemented using one or more computer systems, field programmable gate arrays (FPGAs), or similar devices comprising a processor coupled to a memory and executing code to realize those elements, processes, or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A network device, the device comprising:
   a radio module that includes a plurality of wireless service support circuits, wherein each of the plurality of wireless service support circuits includes modules that configure the radio module to establish wireless network communication links over at least one band of a wireless network operator;
   initialization logic coupled to the radio module;
   a network service preference policy stored in a memory coupled to the initialization logic;
   wherein, upon initialization of the device, the initialization logic performs a survey of one or more wireless services received by the radio module and compares results of the survey against the network service preference policy; and
   wherein the initialization logic activates a first of the plurality of wireless service support circuits associated with a first wireless service of the one or more wireless services when the survey indicates that the first wireless signal satisfies the network service preference policy; and
   one or more sensor modules positioned within the device and configured to wirelessly communicate sensor data with a central network via the radio module using the first wireless service;
   wherein the network service preference policy comprises:
     a primary carrier acceptance thresholds component; and
     a primary carrier candidate preference priority component;
   wherein the primary carrier acceptance thresholds component of the network service preference policy defines acceptance criteria for one or more wireless signal parameters;
   wherein the primary carrier candidate preference priority component indicates a preferred wireless network for the initialization logic to select; and
   wherein the primary carrier acceptance thresholds component and the primary carrier candidate preference priority component are both either locally or remotely reprogrammable; and
   wherein base on the survey, the initialization logic places into a dormant state one or more of the plurality of wireless service support circuits that do not satisfy the network service preference policy.

2. The device of claim 1, wherein the wireless signal parameters include acceptance criteria regarding one or more of:
   network technology;
   tower information;
   network signal strength measurements;
   signal quality measurements; and
   signal interference measurements.

3. The device of claim 1, wherein the primary carrier candidate preference priority component indicates a preferred wireless network for the initialization logic to select when a wireless service associated with the preferred wireless network satisfies the primary carrier acceptance thresholds component of the network service preference policy.

4. The device of claim 1, wherein the initialization logic surveys a wireless service associated with a preferred wireless network indicated by the primary carrier candidate preference priority component before surveying other wireless services.

5. The device of claim 1, wherein the plurality of wireless service support circuits comprise one or more subscriber identification modules (SIMs).

6. The device of claim 1, further comprising at least one external data interface configured to wirelessly communicate data from one or more external devices with a central network via the radio module using the first wireless service.

7. The device of claim 6, further comprising routing logic that routes data communicated between the at least one external data interface and the central network.

8. The device of claim 1, wherein the wireless network initialization logic is implemented by a processor, a field programmable gate array (FPGA), or and application specific integrated circuit (ASIC).

9. The device of claim 1, wherein the radio module comprises multiple individual wireless modems provided within a single form-factor of the network device.

10. A method for wireless device initialization of a network device having a radio module that includes a plurality of wireless service support circuits, wherein each of the plurality of wireless service support circuits includes modules that configure the radio module to establish wireless network communication links over at least one band of a wireless network operator, the method comprising:
    activating initialization logic within the network device to perform a survey of one or more wireless services received by the radio module;
    comparing results of the survey against a network service preference policy;
    activating a first of the plurality of wireless service support circuits associated with a first wireless service of the one or more wireless services when the survey indicates that the first wireless signal satisfies the network service preference policy;
    wirelessly communicating sensor data from one or more sensor modules positioned within the network device with a central network via the radio module using the first wireless service;
    wherein the network service preference policy comprises:
      a primary carrier acceptance thresholds component; and
      a primary carrier candidate preference priority component;
    wherein the primary carrier acceptance thresholds component of the network service preference policy defines acceptance criteria for one or more wireless signal parameters;
    wherein the primary carrier candidate preference priority component indicates a preferred wireless network for the initialization logic to select; and wherein the primary carrier acceptance thresholds component and the primary carrier candidate preference priority component are both either locally or remotely reprogrammable; and wherein base on the survey, the initialization logic places into a dormant state one or more of the plurality of wireless service support circuits that do not satisfy the network service preference policy.

11. The method of claim 10, further comprising:
deactivating one or more of the plurality of wireless service support circuits that do not satisfy the network service preference policy.

12. The method of claim 10, wherein the primary carrier candidate preference priority component indicates a preferred wireless network for the initialization logic to select when a wireless service associated with the preferred wireless network satisfies the primary carrier acceptance thresholds component of the network service preference policy.

13. The method of claim 10, wherein the survey evaluates the one or more wireless services to determine wireless signal parameters including one or more of:
network technology;
tower information;
network signal strength measurements;
signal quality measurements; and
signal interference measurements.

* * * * *